United States Patent [19]

Gelbart et al.

[11] Patent Number: 5,107,372
[45] Date of Patent: Apr. 21, 1992

[54] FOCUS SERVO ACTUATOR FOR MOVING LENS SCANNERS

[76] Inventors: Daniel Gelbart, 3878 Garden Grove Dr., Burnaby B.C., Canada, V5G 4A7; Derek M. Stuart, #407-1755 Robson St., Vancouver B.C., Canada

[21] Appl. No.: 403,456

[22] Filed: Sep. 6, 1989

[51] Int. Cl.$^5$ .................. G02B 7/02; G02B 26/08
[52] U.S. Cl. .................. 359/824; 359/205; 359/823
[58] Field of Search ............ 350/247, 255, 6.1–6.91, 350/269, 273, 275, 319, 257; 369/13, 45, 44.11, 44.14, 44.17, 44.19–44.22, 44.23; 365/122

[56] References Cited

U.S. PATENT DOCUMENTS

| | | | |
|---|---|---|---|
| 4,386,823 | 6/1983 | Musha | 350/255 |
| 4,479,051 | 10/1984 | Musha | 350/247 |
| 4,507,764 | 3/1985 | Musha | 350/247 |
| 4,607,913 | 8/1986 | Jansen | 350/255 |
| 4,679,904 | 7/1987 | Kurihara | 350/6.3 |
| 4,747,668 | 5/1988 | Meyer et al. | 350/255 |
| 4,752,117 | 6/1988 | Ichikawa et al. | 350/247 |
| 4,769,803 | 9/1988 | Yamamiya | 350/6.3 |
| 4,790,628 | 12/1988 | Nanno et al. | 350/247 |
| 4,799,766 | 1/1989 | Estes | 350/255 |
| 4,811,320 | 3/1989 | Kawasaki et al. | 350/6.3 |
| 4,842,392 | 6/1989 | Nakamura et al. | 350/247 |

Primary Examiner—Bruce Y. Arnold
Assistant Examiner—Thong Nguyen

[57] ABSTRACT

A method for focusing a rapidly moving scanning lens is disclosed. The lens is mounted onto a ferromagnetic insert which is attached to the scanning assembly. A stationary electromagnet generates a uniform magnetic field along the path of the scanning lens. This field is coupled to the ferromagnetic insert via a second ferromagnetic insert which is rigidly mounted to the scanning assembly. Changing the current in the electromagnet changes the position of the scanning lens and enables it to focus on the scanned object.

1 Claim, 1 Drawing Sheet

FOCUS SERVO ACTUATOR FOR MOVING LENS SCANNERS

BACKGROUND OF THE INVENTION

In scanning systems with large numerical apertures the scanning lens sometimes has to be moved rapidly across an object in order to scan it, while maintaining precise focus. In those cases it is impractical to use the conventional "voice coil" type of focus servo actuator due to its size and the requirement of an electrical connection to the rapidly moving lens. This is true in particular when the scan distance is large relative to the size of the lens. The current invention overcomes this limitation by using a novel type of moving iron actuator which has a very low mass and requires no electrical connection to the moving part.

SUMMARY OF THE INVENTION

In accordance with the present invention, the scanning lens is not mounted rigidly to the scanning assembly. The scanning assembly consists of the moving parts of the scanning system which could be a linear or circular scanner. Instead, it is elastically mounted to the scanning assembly together with a small piece of ferromagnetic material. When the scanning assembly travels in a magnetic field the lens position can be controlled by changing this magnetic field. This position control can be utilized in an auto-focus servo loop causing the scanning lens to focus on the scanned object. A further object of the present invention is to prevent any of the forces used for focusing from acting directly on the scanning assembly. This is achieved by using a second ferromagnetic insert rigidly attached to the scanning assembly and maintaining an approximately constant air gap during the scan. Another object of this invention is to build an actuator capable of very high acceleration, together with the freedom from electrical connections to the moving part enables a high performance focus servo to be realized.

DETAILED DESCRIPTION OF THE PREFERRED EMBODIMENT

Figure 1:
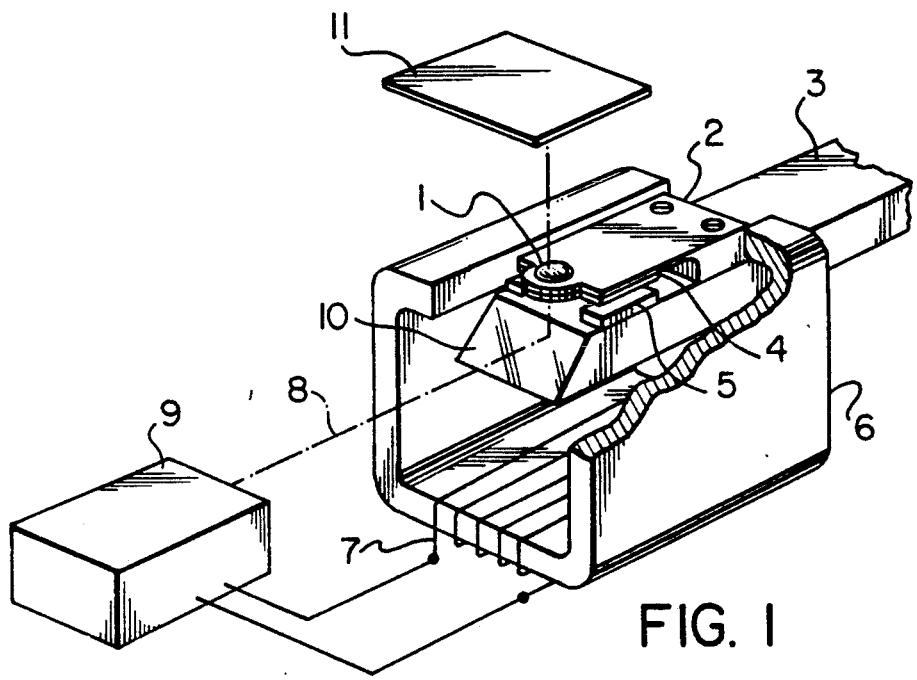
FIG. 1 shows a moving lens scanner equipped with a focus actuator according to this invention.
Figure 2:
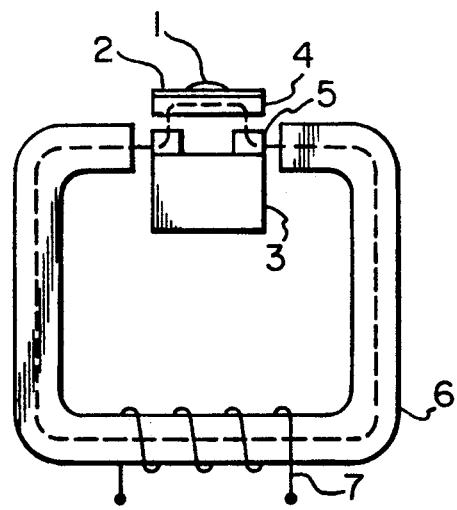
FIG. 2 is a cross section of the actuator showing the path of the magnetic flux.

Referring now to FIGS. 1 and 2, a scanning lens 1 is mounted to a scanning assembly 3 via an elastic member 2. Elastic member 2 is made of non-magnetic material and capable of flexing and moving lens 1 towards and away from scanned object 11. A ferromagnetic insert 4 is permanently bonded to member 2. A second ferromagnetic insert, in the form of two elongated slabs 5, is rigidly attached to scanning assembly 3. Scanning assembly 3 moves back and forth between the poles of an electromagnet 6 energized by winding 7. The travel of scanning assembly 3 is long compared to the size of lens 1. No further details on the scanning assembly are given since it does not form a part of this invention. Referring now to FIG. 2, the path of the magnetic flux is shown as a dotted line. The flux travels along electromagnet 6, across the air gap into insert 5, across a second air gap into moving insert 4 and returns to 6.

The purpose of insert 5 is to keep the force applied to flexible member 2 in the vertical direction only. Without insert 5, any centering error of insert 4 in the air gap of electromagnet 6 would have caused considerable side forces, causing undesirable twist in flexible member 2. Using insert 5 the side forces are minimized when electromagnet 6 is not centered on scanning assembly as well as keeping the pull exerted by electromagnet 6 on insert 4 constant even when centering of scanning assembly 3 inside air gap of electromagnet 6 is disturbed. This is due to the fact that the sum of the air gaps remains constant for moving scanning assembly 3 to the left or to the right of its center position. A further advantage of insert 5 is that there is no net force applied to scanning assembly 3 since the force on insert 4 is cancelled by an identical force on insert 5 this no net force is applied to scanning assembly 3 in the focusing direction.

In the preferred embodiment electromagnet 6 is made of a ferrite in order to minimize hysteresis and eddy current losses. Winding 7 contains about 200 turns of wire. Insert 5 is made of the same ferrite material as electromagnet 6 and insert 4 is made of silicon steel, also known as "transformer steel". Flexible member 2 is made of hard aluminum. The air gap between parts 6 and 5 and between parts 5 and 4 is under one millimeter. The spring constant of flexible member 2 is about 10,000 newton/meter. The lens is a plastic aspheric lens in order to achieve low mass.

In operation a focus servo unit 9 sends a light beam 8 via lens 1 onto object 11. The beam 8 is reflected by mirror 10 mounted on scanning assembly 3. The return beam, returning from object 11 to unit 9 via mirror 10 enables unit 9 to measure the deviation from perfect focus. This error signal is used in a focus servo to control the current in winding 7, causing the magnetic field to change and the deflection of flexible member 2 to change. This change affects the distance of lens 1 from scanned object 11. All components of the focus servo unit 9 such as focus detector and error amplifier are of conventional nature and will not be discussed here. They are covered in many books on focus servo systems, such as "Principles of Optical Disc Systems", published by Adam Hilger Ltd. (Boston, MA.).

It will also be apparent to anybody versed in the art that the same design can be used when motion of scanning assembly 3 is circular instead of linear. It is also apparent that elastic member 2 can be made of ferromagnetic material, eliminating the need for insert 4, however, causing the weight of member 2 to increase and therefore somewhat reducing the response time.

What is claimed is:

1. A focus servo actuator for moving lens scanners comprising: a scanning lens attached to a moving part of a mechanical scanning assembly through a flexible member made of a non-magnetic material, said flexible member capable of moving said lens in a direction perpendicular to a scan direction of said mechanical scanning assembly; a ferromagnetic insert permanently attached to said flexible member; a second ferromagnetic insert rigidly mounted to the moving part of said scanning assembly leaving an air gap between said second insert and said first insert: a stationary electromagnet means for generating a magnetic field according to an applied electric current, said magnetic field causing the said first insert to be attracted to said second insert and thus moving said lens.

* * * * *